(12) United States Patent
Hong et al.

(10) Patent No.: US 8,963,453 B2
(45) Date of Patent: Feb. 24, 2015

(54) METHOD AND APPARATUS FOR SYNCHRONIZATION OF PULSE WIDTH MODULATION

(75) Inventors: Bok Young Hong, Cedarburg, WI (US); Craig R. Winterhalter, Cedarburg, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 631 days.

(21) Appl. No.: 12/970,246

(22) Filed: Dec. 16, 2010

(65) Prior Publication Data
US 2012/0153882 A1    Jun. 21, 2012

(51) Int. Cl.
 *H02P 1/54* (2006.01)
 *H02P 27/08* (2006.01)
 *H02M 1/14* (2006.01)

(52) U.S. Cl.
 CPC ....... *H02P 27/08* (2013.01); *H02M 1/14* (2013.01)
 USPC .............................. 318/41; 318/599; 318/603

(58) Field of Classification Search
 USPC ............... 318/41, 52, 400.07, 254, 599, 603; 363/87
 See application file for complete search history.

(56) References Cited

U.S. PATENT DOCUMENTS

| | | | | |
|---|---|---|---|---|
| 7,049,771 B2 * | 5/2006 | Katanaya | ................. | 318/400.13 |
| 7,154,244 B2 * | 12/2006 | Asaumi et al. | ................ | 318/599 |
| 2006/0034364 A1 * | 2/2006 | Breitzmann et al. | .......... | 375/238 |
| 2007/0013325 A1 * | 1/2007 | Kiuchi et al. | ................... | 318/34 |
| 2012/0014147 A1 * | 1/2012 | Radosevich | .................... | 363/71 |

FOREIGN PATENT DOCUMENTS

JP      2007244009 A  *  9/2007

* cited by examiner

*Primary Examiner* — Rina Duda
*Assistant Examiner* — Bickey Dhakal
(74) *Attorney, Agent, or Firm* — Boyle Fredrickson, S.C.

(57) ABSTRACT

An inverter executing a PWM routine is configured to synchronize the switching periods of the PWM routine to an external signal. The external signal is generated, for example, by another inverter, a converter, or a high level controller. The external signal is preferably generated periodically, and the switching period is resynchronized to the external signal each time the external signal is received. Optionally, either the start time or the midpoint of the switching period may be aligned with external signal. Further, the external signal may be sent to multiple inverters. Preferably, a first portion of the inverters align the start time of their respective switching period to the external signal and a second portion of the inverters align the midpoint of their respective switching period to the external signal.

20 Claims, 4 Drawing Sheets

METHOD AND APPARATUS FOR SYNCHRONIZATION OF PULSE WIDTH MODULATION

BACKGROUND OF THE INVENTION

The subject matter disclosed herein relates to power converters, such as inverters for motor control. More specifically, the inverter executes a pulse width modulation (PWM) routine and coordinates the switching periods of the PWM routine with a synchronizing signal.

As is known to those skilled in the art, a motor drive receives an input voltage and converts the input voltage to a suitable output voltage for controlling operation of a motor. In an Alternating Current (AC) motor drive, a three phase AC voltage is typically available at, for example, 230 V or 460 V as the input voltage. The motor drive includes a converter section that rectifies the AC input voltage into a Direct Current (DC) voltage. The DC voltage is present across a positive and a negative terminal of a DC bus in the motor drive. An inverter section includes switches, such as transistors, thyristors, or silicon-controlled rectifiers to convert the DC voltage on the DC bus into an AC voltage output at the desired magnitude and frequency to control operation of the motor.

The motor drive often utilizes a pulse-width modulation (PWM) routine to control the switches in the inverter section. The switches alternately connect and disconnect either the positive or the negative terminal of the DC bus to the AC output. The resulting output is, therefore, either zero volts or fully on at the voltage level present on the DC bus. In order to vary the magnitude of the output voltage, the PWM routine repeatedly executes at a predetermined interval, sometimes referred to as a carrier period, where the inverse of the carrier period is the carrier frequency. The PWM routine receives a reference signal corresponding to the desired output voltage magnitude and controls the switches such that the DC bus is connected to the output for a portion of the carrier period. Thus, during each carrier period, the output is on for a percentage of the carrier period and off for the remaining percentage of the carrier period and an average voltage magnitude for each carrier period results. By varying the percentage of the carrier period that each switch is on or off, the average voltage magnitude varies such that it corresponds to the reference signal input to the PWM routine. If the fundamental frequency of the desired AC voltage is much less than the carrier frequency, the resulting output voltage waveform approximates the desired AC voltage.

However, the high frequency switching generates undesirable AC electrical content at the carrier frequency and harmonics, or multiples, thereof. These high frequency electrical components may result in radiated and/or conducted emissions that are coupled back to the AC input voltage. In addition, motors may not always be located near the drives by which they are controlled. Using long motor leads to connect the motors and drives may result in reflected waves being established on the motor leads. Because of the high frequency of these emissions, leakage currents may be established through capacitive coupling between leads and to ground. If left unmitigated, these conducted emissions could interfere with other electrical devices receiving the same input voltage or connected elsewhere within the facility.

In order to prevent these conducted emissions from being transmitted back to the AC input voltage, a line filter is typically connected at the input of the motor drive. However, line filters add cost and require additional space near the motor drive. Further, many systems require multiple motors and multiple motor drives to control those motors, increasing the total magnitude of the conducted emissions. Consequently, either multiple filters, connected to each drive, or a single filter, having increased capacity may be required. Either option increases the cost and space dedicated to filters. Thus, it would be desirable to provide a system to reduce the total emissions generated by inverters such that smaller filters may be utilized

BRIEF DESCRIPTION OF THE INVENTION

The subject matter disclosed herein describes an inverter executing a PWM routine configured to synchronize the switching periods of the PWM routine to an external signal. The external signal is generated, for example, by another inverter, a converter, or a high level controller. The external signal is preferably generated periodically, and the switching period is resynchronized to the external signal each time the external signal is received. Optionally, either the start time or the midpoint of the switching period may be aligned with external signal. Further, the external signal may be sent to multiple inverters. Preferably, a first portion of the inverters align the start time of their respective switching period to the external signal and a second portion of the inverters align the midpoint of their respective switching period to the external signal.

According to one embodiment of the invention, a motor drive having an inverter section for converting DC voltage into an AC voltage includes a DC voltage bus, having a positive terminal and a negative terminal, and a plurality of switches selectively connecting the positive terminal and the negative terminal to at least one output terminal. Each switch is responsive to a corresponding switching signal. The inverter also includes a memory device storing a plurality of processor executable instructions. A processor is in communication with the memory device and operable to execute the instructions to generate the switching signals at a periodic interval. An input is configured to receive an external, periodic synchronizing signal, and a selectable point within the periodic interval at which the switching signals are generated is temporally aligned with the synchronizing signal.

As another aspect of the invention, multiple inverters may be provided, and each inverter coordinates its respective switching signals to the synchronizing signal. Each inverter may be executing a PWM routine having a switching period corresponding to the periodic interval at which the switching signals are generated. A first portion of the inverters coordinate the synchronizing signal to a first time within their respective switching periods and a second portion of the inverters coordinate the synchronizing signal to a second time within their respective switching periods. The second time is offset from the first time by about one half of the duration of one switching period.

Thus, it is a feature of this invention that an inverter may temporally align its switching interval with a reference signal. It is another feature of the invention that by coordinating the switching periods of a first portion of the inverters at a first time and a second portion of the inverters at a second time the overall conducted emissions of a multiple inverter system is reduced.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
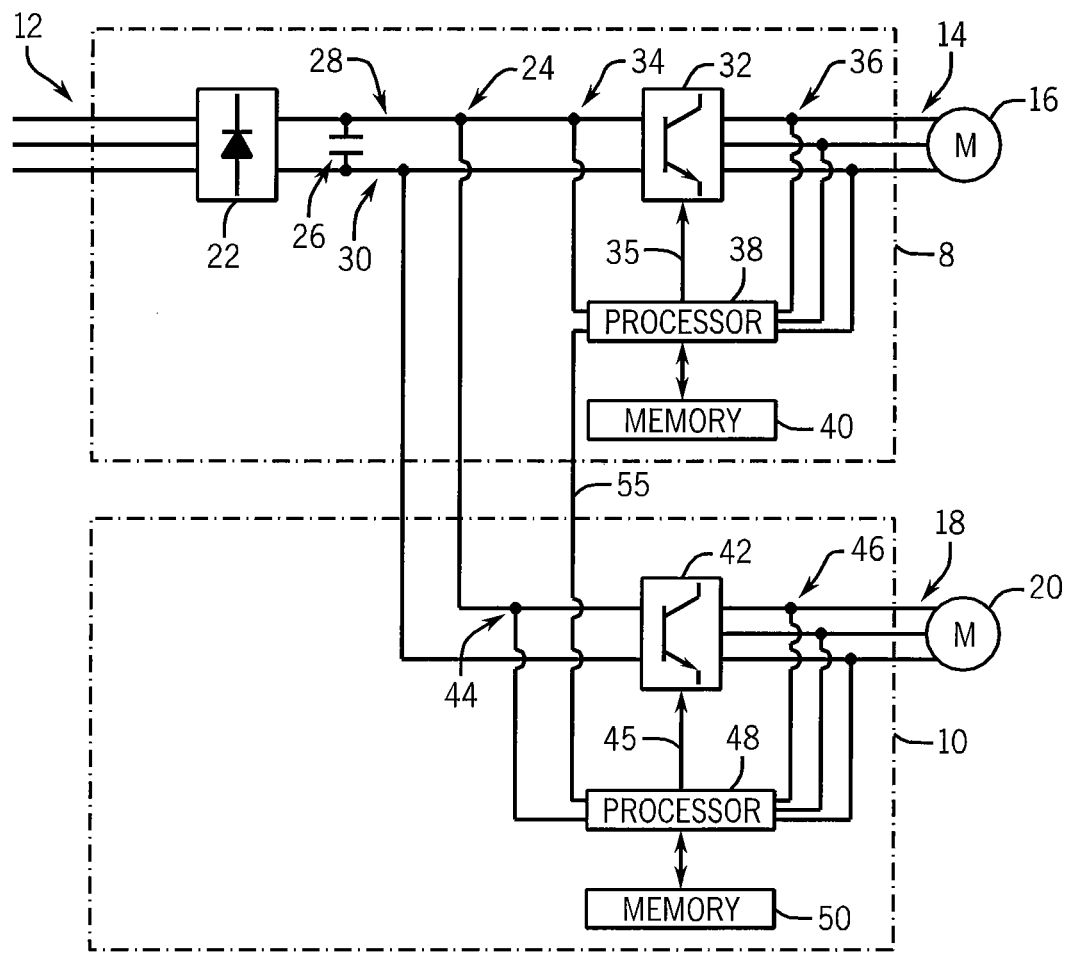
FIG. 1 illustrates an exemplary system including multiple inverters incorporating the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

Turning initially to FIG. 1, a first motor drive 8 and a second motor drive 10 are connected to a three phase AC input voltage 12. The first motor drive 8 generates a first output voltage 14, illustrated as a three phase AC output voltage, to control a first motor 16, and the second motor drive 10 generates a second output voltage 18, also illustrated as a three phase AC output voltage, to control a second motor 20. It is contemplated that the output voltage, 14 or 18, for either motor drive, 8 or 10 respectively, could be a single phase AC output voltage, a multi-phase AC output voltage, or a DC voltage, as required by the motor connected to the drive without deviating from the scope of the invention.

The AC input voltage 12 is converted to a DC voltage present on the DC bus 24 by a converter section 22. As illustrated in FIG. 1, a single converter section 22 is supplied in the first motor drive 8 and the DC bus 24 is connected in parallel between the first motor drive 8 and the second motor drive 10. It is contemplated that other configurations of motor drives and converter sections 22 could be realized without deviating from the scope of the invention, including but not limited to each motor drive, 8 and 10, having a separate converter section 22, additional motor drives connected in parallel to the DC bus 24, or a combination thereof. The converter section 22 may be either passive or active, where a passive rectifier utilizes electronic devices such as diodes, which require no control signals, to convert the AC voltage to a DC voltage and an active converter utilizes, for example, transistors, which receive switching signals to turn on and off, to convert the AC voltage to a DC voltage.

The DC voltage potential is present between a positive terminal 28 and a negative terminal 30 of the DC bus 24. A DC bus capacitor 26 is connected between the positive and negative terminals, 28 and 30, to reduce the magnitude of the ripple voltage resulting from converting the AC voltage to a DC voltage. It is understood that the DC bus capacitor 26 may be a single capacitor or multiple capacitors connected in parallel, in series, or a combination thereof. The magnitude of the voltage potential between the negative and positive terminals, 30 and 28, is generally about equal to the magnitude of the peak of the AC input voltage. A first sensor 34 measures the voltage on the DC bus 24 and provides a signal corresponding to the measured voltage to a processor 38 on the first motor drive 8, and a second sensor 44 measures the voltage on the DC bus 24 and provides a signal corresponding to the measured voltage to a second processor 48 on the second motor drive 10.

Figure 2:
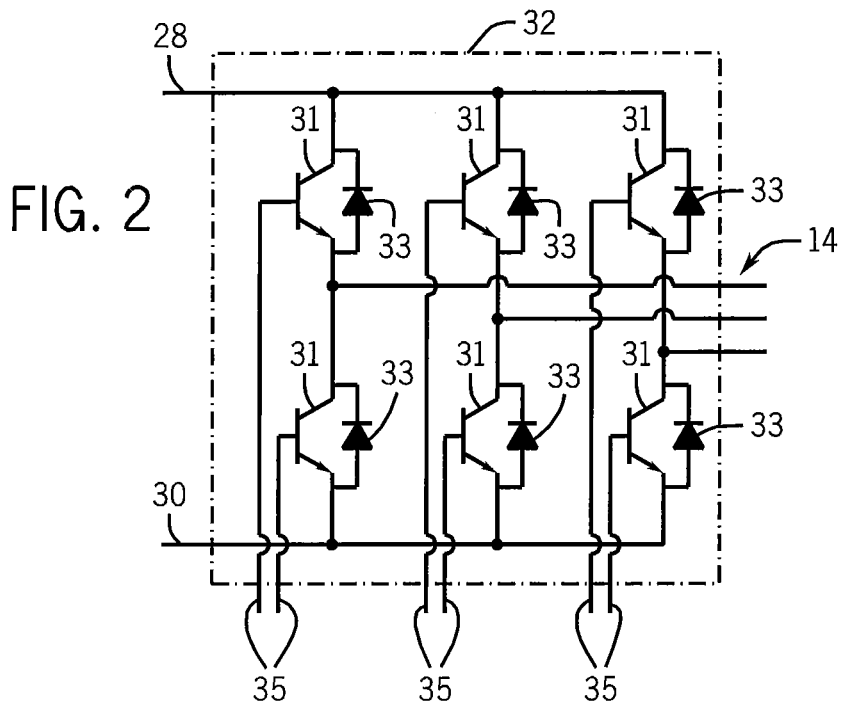
FIG. 2 is a schematic representation of an inverter section from FIG. 1.

The DC voltage on the DC bus 24 is converted to an AC voltage by an inverter section, 32 or 42. A first inverter section 32 on the first motor drive 8 converts the DC voltage to a three-phase output voltage 14 supplied to the first motor 16, and a second inverter section 42 on the second motor drive 10 converts the DC voltage to a three-phase output voltage 18 supplied to the second motor 20. Each inverter section, 32 and 42, includes multiple switches 31 which selectively connect one of the output phases 14 to either the positive terminal 28 or the negative terminal 30. Referring also to FIG. 2, each switch 31 may be a transistor and further include a diode 33 connected in parallel to the transistor. Each switch 31 receives a switching signal 35 to enable or disable conduction through the transistor to selectively connect each output phase 14 to the positive terminal 28 or the negative terminal 30 of the DC bus 24.

The current output from the inverter section is measured and provided as a feedback signal to the processor 38. One, two, or all three output phases, 14 or 18, may include a current sensor, 36 or 46. The first drive 8 includes first current sensors 36 to provide signals to the first processor 38 corresponding to the magnitude of the current output to the first motor 16. The second drive 10 includes second current sensors 46 to provide signals to the second processor 48 corresponding to the magnitude of the current output to the second motor 20.

Each processor, 38 and 48, executes a program stored on a memory device, 40 or 50 respectively, where the program includes a series of instructions executable on the processor. Each program receives a reference signal identifying desired operation of the motor, 16 or 20, connected to the motor drive, 8 or 10. The program executes a control routine responsive to the reference signal and the feedback signals from the voltage sensors, 34 or 44, and the current sensors, 36 and 46. The control routine generates a desired voltage reference signal 104, see also FIG. 3. The processor, 38 and 48, further executes a modulation routine, such as pulse width modulation (PWM), to generate switching signals, 35 or 45, to control the switches 31 responsive to the desired voltage reference signal 104.

Figure 3:
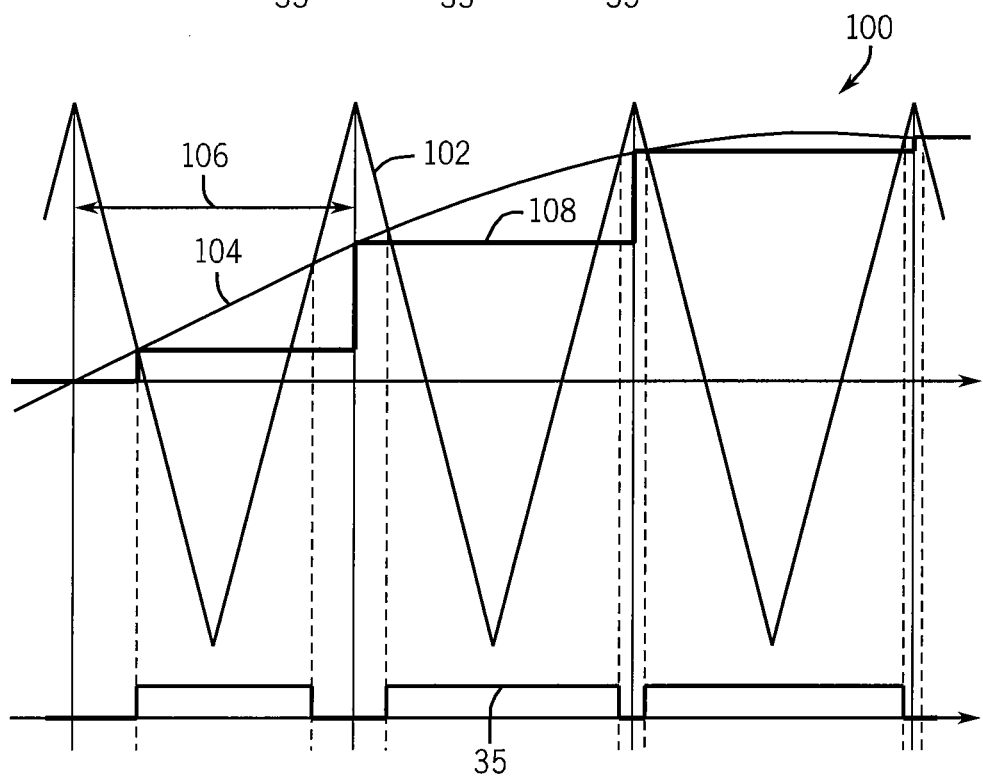
FIG. 3 is a graphical representation of a segment of one phase of an AC voltage output by an inverter section according to a PWM routine.

Referring next to FIG. 3, a segment of one phase of an AC voltage output according to a sine-triangle PWM routine 100 is illustrated. In the sine-triangle routine 100, a triangular waveform 102 is compared to the voltage reference 104 to generate switching signals 35. The switching signals 35 control the switches 31 that selectively connect or disconnect each output phase 14 to either the positive terminal 28 or negative terminal 30 of the DC bus 24. One period of the triangular waveform 102 is defined by the switching period 106 of the PWM routine. During the switching period, if the voltage reference 104 is greater than the triangular waveform 102, the switching signal 35 is set high and, if the voltage reference 104 is less than the triangular waveform 102, the switching signal 35 is set low. The resulting output voltage 108 can be represented by a stepped waveform where the magnitude of the output voltage 108 during each period 106 is the average value of the output voltage 108. The average value is determined by multiplying the magnitude of the DC voltage present on the DC bus 24 by the percentage of the period 106 that the switching signal 35 is set high. As the switching period 106 of the PWM routine decreases, the stepped output voltage 108 more accurately corresponds to the voltage reference 104. It is contemplated that other PWM routines, as would be known to one skilled in the art, may also be used to generate the output voltage, such as space-vector or multi-level routines. Further, the routines may be implemented by analog signals, as shown in FIG. 3, digital signals, for example a register being incremented up and down may replace the triangle waveform, or a combination thereof.

The processor, 38 or 48, in each drive, 8 and 10, is configured to receive a synchronizing signal 55 to which the PWM routine is coordinated. The synchronizing signal 55 may be generated by a system controller (not shown) or, optionally, one of the drives, 8 or 10, may be configured as a master drive and the other drive, 8 or 10, may be configured as a follower drive. As shown in FIG. 1, the first drive 8 is configured as a master drive and generates the synchronizing signal 55. The second drive 10 is configured as a follower drive 10 and receives the synchronizing signal 55.

Figure 4:
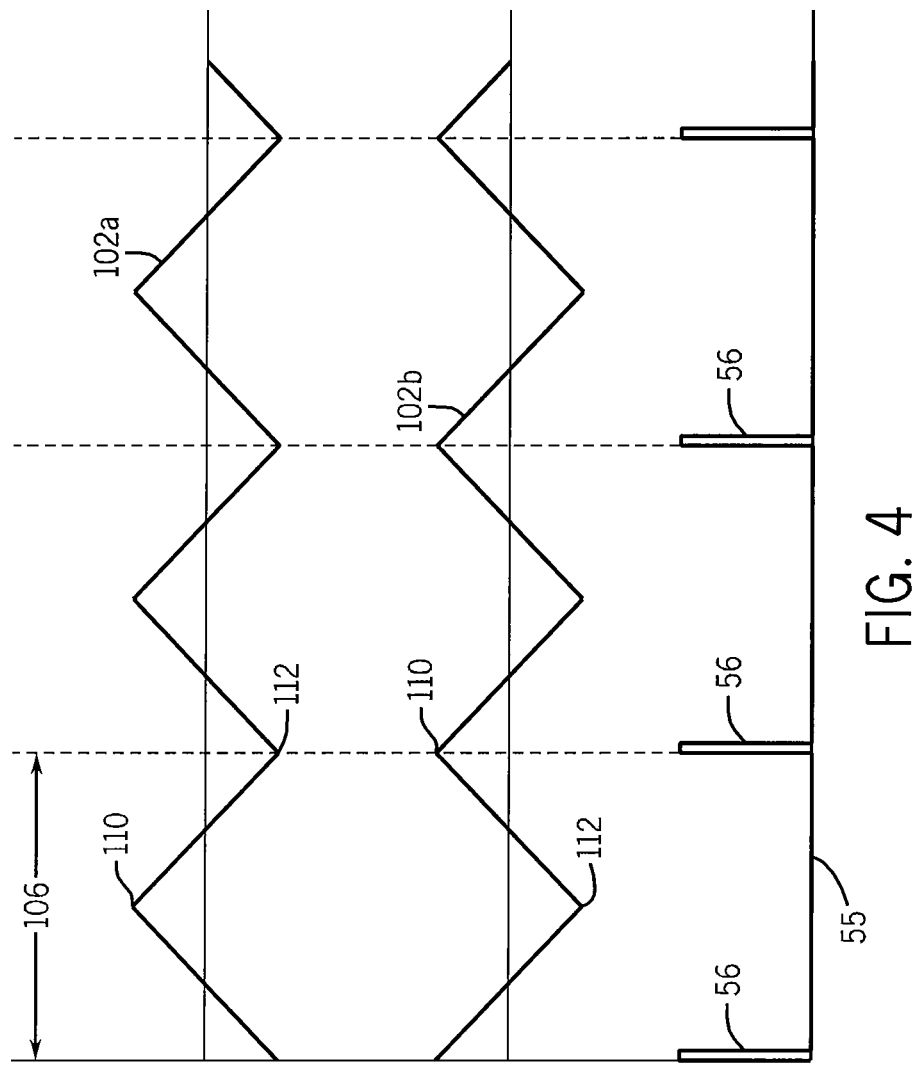
FIG. 4 is a graphical representation of two triangle waveforms as shown in FIG. 3 coordinated with a synchronizing signal according to one embodiment of the present invention.

Referring next to FIG. 4, the synchronizing signal 55 periodically includes a pulse 56, or transition, to which the PWM routine may be coordinated. When the processor, 38 or 48, receives the pulse 56 on the synchronizing signal 55, the processor, 38 or 48, temporally aligns a point within the switching period 106 with the pulse 56. As illustrated in FIG. 4, two such points within the switching period 106 to which the synchronizing signal 55 may be coordinated are the maximum value 110 or the minimum value 112 of the triangle waveform 102. It is contemplated that the synchronizing signal 55 may be coordinated with other points within he switching period 106 without deviating from the scope of the present invention. Further, the pulse 56 may be periodically generated to coordinate each switching period 106 or, optionally, may be generated less frequent than each switching period 106 but often enough, as may be determined by the system requirements, to substantially maintain the temporal alignment between the PWM routine and the synchronizing signal 55.

In operation, the synchronizing signal 55 is used to coordinate generation of switching signals, 35 or 45, in an inverter, 32 or 42 respectively. In a PWM routine, a point within the switching period 106 is aligned with a periodic pulse 56 on the synchronizing signal 55. Coordination of the switching period 106 with the pulse 56 may be performed, for example, by selecting a desired point along the triangle waveform 102 to align with the start of the switching period 106. The point along the triangle waveform 102 that is aligned with the periodic pulse is preferably configurable. For example, the triangle waveform 102 may be configured to begin generation at either the maximum value 110 or the minimum value 112 of the waveform 102. It is further contemplated that any point along the triangle waveform 102 may be selected at which to begin generation in coordination with the start of the switching period 106. When the processor 38 receives the initial pulse 56 from the synchronizing signal 55, the PWM routine then begins generating the triangle waveform 102 at the preconfigured starting point.

In another embodiment, the PWM routine may use a counter register, rather than a triangle waveform, against which to compare the voltage reference 104. The register may be used to store an initial value. Within each period 106, the register is incremented down and back up, or vice versa, between a minimum value 112 and a maximum value 110 of the register. The voltage reference 104 may be either generated as a digital value or converted from an analog signal to a digital value by an analog-to-digital converter. The digital value of the voltage reference 104 is then compared to the counter register to generate switching signals 35. Coordination of the switching period 106 with the pulse according to this embodiment may be performed, for example, by selecting a desired initial value to store in the register. The initial value may be the minimum value 112, the maximum value 110, or any value in between. When the processor 38 receives the initial pulse 56 from the synchronizing signal 55, the PWM routine then begins counting up or down, as desired, from the preset value. It is contemplated that still other PWM routines may be used and coordination of the PWM routine with the synchronizing signal 55 is performed according to the characteristics of the PWM routine.

If only an initial synchronization is performed by the processor 38, the selected point within the switching period 106 may begin to drift away from the pulse 56 of the synchronizing signal 55. The switching period 106 is generated within the PWM routine and is, therefore, a function of operating parameters within the processor 38, including, for example, variations in the clock frequency, execution times of other routines, and servicing interrupts. Thus, even if the first drive 8 and the second drive 10 include identical hardware, variations due to manufacturing tolerances or motor operation will cause the duration of switching periods 106 to vary. As a result, the switching generated by the two inverters drifts into and out of alignment with each other.

Consequently, the processor 38 will periodically execute to realign the switching period 106 with the pulse 56 of the synchronizing signal 55. Similar to the initial alignment, the processor 38 can execute to adjust the triangle waveform 102 or the value in the counter register to match the preconfigured starting point. If the realignment is performed on a regular basis, the difference between the actual value of the triangle waveform 102 or the counter register should be minimal and the adjustment can be made with minimal impact on the performance of the inverter 32. Preferably, the pulse 56 is generated and the realignment is performed each switching period 106 to maintain alignment between the switching period 106 and the synchronizing signal 55.

Figure 5:
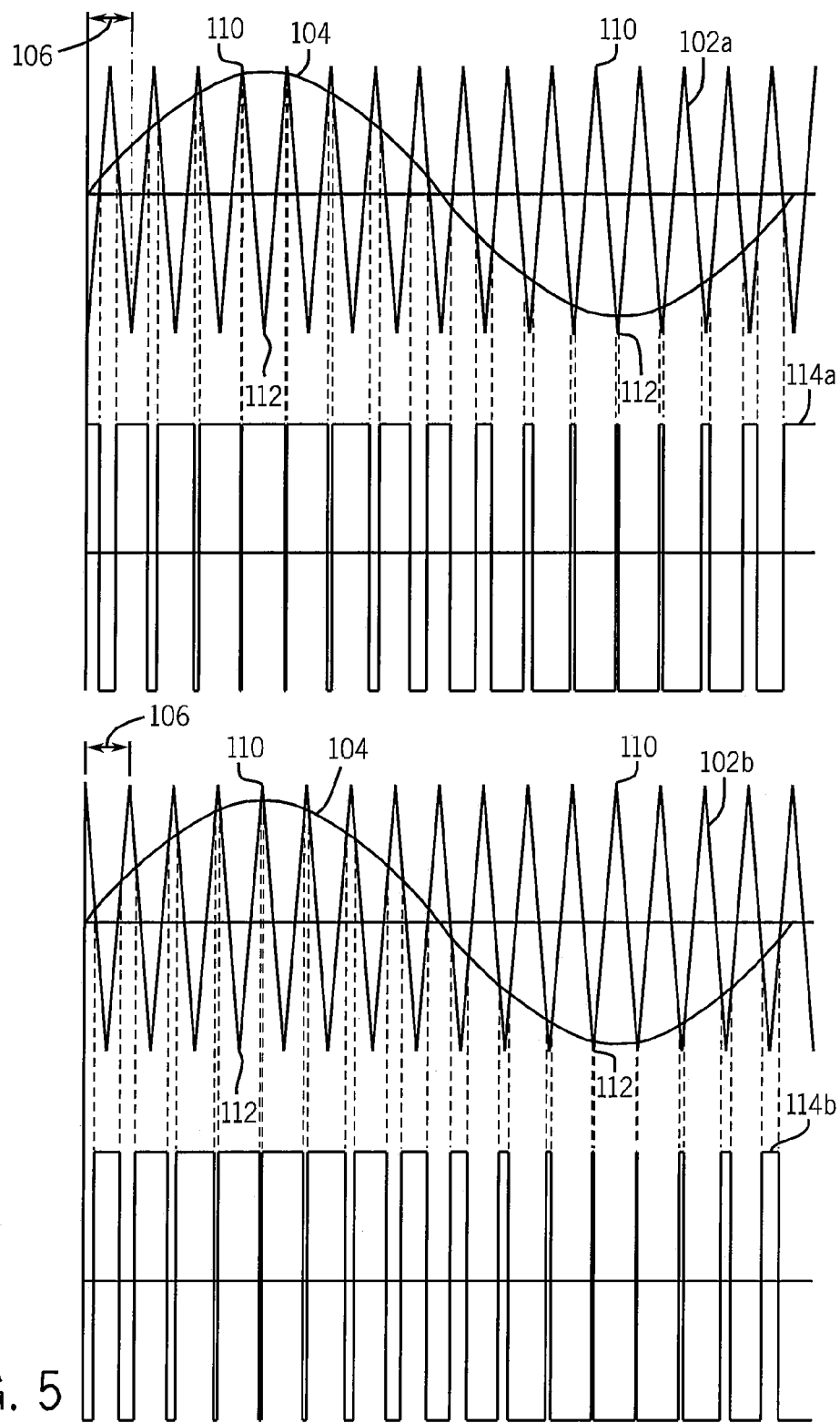
FIG. 5 is a graphical representation of two PWM output voltages as shown in FIG. 3 coordinated with a synchronizing signal according to one embodiment of the present invention.

If multiple drives, 8 and 10, are coordinated to the same synchronizing signal 55, different points in the switching periods 106 of the respective inverters, 32 and 42, may be coordinated with the synchronizing signal 55. Referring also to FIGS. 4 and 5, the first motor drive 8 may be configured such that the minimum value 112 of the triangle waveform 102a is aligned with the pulse 56 of the synchronizing signal 55, and the second motor drive 10 may be configured such that the maximum value 110 of the triangle waveform 102b is aligned with the pulse 56 of the synchronizing signal 55.

By coordinating different points in the switching periods 106 of each drive with the synchronizing signal 55, the total conducted emissions generated by the inverters in the system may be reduced. As previously discussed, the high frequency switching of the PWM routines may result in undesired AC emissions at the switching frequency or harmonics thereof. Coordinating the switching periods 106 of different inverters such that the period 106 of the PWM routine aligns differently with respect to the pulses 56 of the synchronizing signal 55 generates AC emissions from each inverter that tend to be out of phase with each. For example, in the exemplary sine-triangle PWM routine 100 of FIGS. 3-5, the voltage output, 14 or 18, is a function of the voltage reference signal 104 and the triangle waveform, 102a or 102b. If the voltage reference signal 104 is greater in magnitude than the triangle waveform 102a or 102b, a switch 31 connects the output, 14 or 18, to the positive terminal 28 of the DC bus 24. If the voltage reference signal 104 is lesser in magnitude than the triangle waveform 102a or 102b, a switch 31 connects the output, 14 or 18, to the negative terminal 30 of the DC bus 24. Consequently, as illustrated in FIG. 5, the same voltage reference 104 with inverted triangle waveforms, 102a or 102b, results in output voltages, 114a or 114b, respectively, which are frequently of opposite polarity.

Selection of the point within the switching period 106 at which each inverter is aligned is configurable. Preferably, each drive, 8 or 10, includes an operator interface by which the point may be selected. Optionally, the point may be predetermined and stored in memory, 40 or 50. As still another option, one of the processors, 38 or 48, may execute a routine to identify the number of inverters, 32 or 42, connected within the system. The routine may then assign a first portion of the inverters to coordinate a first point within their respective switching periods 106 to the synchronizing signal 55 and a second portion of the inverters to coordinate a second point within their respective switching periods 106 to the synchronizing signal 55. The inverters may be assigned to either the first portion or the second portion on an alternating basis, or, optionally, the inverters may be assigned to the first portion or the second portion as a function of the length of the power leads extending between each inverter and its respective motor. Although, the exemplary embodiment as described includes two inverters, 32 and 42, it is further contemplated that additional inverters may be included in the system according to system requirements.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention

We claim:

1. A system for controlling a motor, the system comprising:
a motor drive; and
a controller external to the motor drive and configured to generate a periodic synchronizing signal at a defined interval, wherein the motor drive includes:
a direct current (DC) bus having a positive terminal and a negative terminal;
a plurality of switches selectively connecting the positive terminal and the negative terminal to at least one output terminal, each switch responsive to a corresponding switching signal;
an input configured to receive the periodic synchronizing signal from the controller;
a memory device storing a plurality of processor executable instructions; and
a processor in communication with the memory device and operable to execute the instructions to:
generate a carrier signal for a modulation routine at a first periodic interval,
generate the switching signals as a function of the carrier signal and of a voltage reference signal within the first periodic interval, and
at a second periodic interval, temporally align a selectable point on the carrier signal with the synchronizing signal.

2. The system of claim 1 wherein the modulation routine is a PWM routine, the first periodic interval is a switching period of the PWM routine, and the processor is further operable to generate the switching signals according to the PWM routine.

3. The system of claim 2 wherein one of a start time and a midpoint of the switching period is the selectable point within the carrier signal.

4. The system of claim 2 wherein the motor drive is a first motor drive, the controller is a second motor drive, and the synchronizing signal is generated by a second PWM routine executing in the second motor drive such that the carrier signal of the first motor drive and a carrier signal in the second motor drive are coordinated.

5. The system of claim 4 wherein one of a first time or a second time within the switching period of each PWM routine is coordinated to execute with the synchronizing signal, wherein the second time is offset from the first time by about one half of the switching period.

6. The system of claim 5 wherein the first time is a start time of the switching period and the second time is a midpoint of the switching period.

7. The motor drive of claim 1 wherein the first periodic interval is equal to the second periodic interval.

8. A system for controlling multiple motors comprising;
a controller configured to generate a periodic synchronizing signal at a defined interval;
a first motor drive configured to control a first motor, the first motor drive including:
a first inverter section configured to convert a DC voltage input to an AC voltage output;
a first memory device storing a plurality of processor executable instructions;
a first input configured to receive the periodic synchronizing signal; and
a first processor in communication with the first memory device, wherein the first processor is operable to execute the instructions to generate a first carrier signal for a modulation routine for the first motor drive at a first periodic interval and temporally align the first carrier signal with the synchronizing signal at a second periodic interval; and
a second motor drive configured to control a second motor, the second motor drive including:
a second inverter section configured to convert a DC voltage input to an AC voltage output;
a second memory device storing a plurality of processor executable instructions;
a second input configured to receive the periodic synchronizing signal; and
a second processor in communication with the second memory device, wherein the second processor is operable to execute the instructions to generate a second carrier signal for a modulation routine for the second motor drive at a third periodic interval and temporally align the second carrier signal with the synchronizing signal at the second periodic interval.

9. The system of claim 8 wherein, on the first and the second motor drives, the modulation routine is a PWM routine, the first periodic interval is a switching period of the PWM routine of the first motor drive, the third periodic interval is a switching period of the PWM routine of the second motor drive, and the processor of the first and the second motor drive is further operable to generate the switching signals according to the respective PWM routine.

10. The system of claim 9 wherein one of a first time or a second time within the switching period of each PWM routine is coordinated to execute with the synchronizing signal.

11. The system of claim 10 wherein the second time is offset from the first time by about one half of the switching period.

12. The system of claim 10 wherein the first time is a start time of the switching period and the second time is a midpoint of the switching period.

13. The system of claim 12 wherein the first motor drive coordinates the synchronizing signal with the start time of the switching period and the second motor drive coordinates the synchronizing signal with the midpoint of the switching period.

14. The system of claim 13 further comprising a plurality of motor leads establishing an electrical connection between the AC voltage Output the first and the second motor drives and its respective motor, wherein the first and the second motor drives coordinate the synchronizing signal with either the start time or the midpoint of the switching period as a function of a length of the motor leads connected to the motor drive.

15. The system of claim 14 wherein one of the first and the second motor drives is designated as a master and the master generates the synchronizing signal as a function of its periodic interval and transmits the synchronizing signal to the other motor drive.

16. A method of coordinating carrier signals for modulation routines in a plurality of motor drives, the steps comprising:
generating a periodic synchronizing signal at a first periodic interval with a controller external to at least one of the motor drives;
receiving at an input to at least one of the motor drives the periodic synchronizing signal;
generating a first carrier signal at a second periodic interval for the modulation routine in a first portion of the plurality of motor drives;
generating a second carrier signal at the second periodic interval for the modulation routine in a second portion of the plurality of motor drives;
aligning a first time within the first carrier signal to the synchronizing signal, and
aligning a second time within the second carrier signal to the synchronizing singnal.

17. The method of claim 16 wherein the second time is offset from the first time by about one half of a duration of the second periodic interval.

18. The method of claim 17 wherein the first time is the start of the second periodic interval and the second time is the midpoint of the second periodic interval.

19. The method of claim 18 further comprising the initial step of alternately assigning each of the plurality of motor drives to either the first portion or the second portion.

20. The method of claim 18 further comprising the initial step of assigning each of the plurality of motor drives to either the first portion or the second portion as a function of a length of the leads between each of the plurality of motor drives and its respective load.

* * * * *